United States Patent
Liu et al.

(10) Patent No.: US 12,326,814 B1
(45) Date of Patent: Jun. 10, 2025

(54) SYSTEMS AND METHODS FOR FETCHING AND WRITING INSTRUCTIONS TO MEMORY

(71) Applicant: Beken Corporation, Shanghai (CN)

(72) Inventors: Zhifu Liu, Shanghai (CN); Zhilei Wang, Shanghai (CN); Pujie Yang, Shanghai (CN); Caogang Yu, Shanghai (CN)

(73) Assignee: Beken Corporation, Shanghai (CN)

( * ) Notice: Subject to any disclaimer, the term of this patent is extended or adjusted under 35 U.S.C. 154(b) by 0 days.

(21) Appl. No.: 18/613,951

(22) Filed: Mar. 22, 2024

(30) Foreign Application Priority Data

Feb. 27, 2024 (CN) .......................... 202410218254.4

(51) Int. Cl.
*G06F 12/0875* (2016.01)
*G06F 12/02* (2006.01)

(52) U.S. Cl.
CPC ...... *G06F 12/0875* (2013.01); *G06F 12/0246* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 4,654,480 A | * | 3/1987 | Weiss | H04L 1/1657 713/181 |
| 5,675,762 A | * | 10/1997 | Bodin | G06F 12/1081 711/E12.067 |
| 2012/0192035 A1 | * | 7/2012 | Nakanishi | G06F 11/1004 714/766 |
| 2012/0311408 A1 | * | 12/2012 | Nakanishi | G06F 13/4252 714/E11.035 |
| 2013/0326304 A1 | * | 12/2013 | Bueb | H03M 13/29 714/755 |
| 2016/0078226 A1 | * | 3/2016 | Dalton | G06F 21/554 726/23 |
| 2018/0293129 A1 | * | 10/2018 | Aberl | G06F 11/1068 |
| 2023/0315302 A1 | * | 10/2023 | Benisty | G06F 3/061 714/800 |
| 2023/0418655 A1 | * | 12/2023 | Sankaran | G06F 9/30181 |
| 2024/0354190 A1 | * | 10/2024 | Shi | G06F 11/1004 |

* cited by examiner

*Primary Examiner* — Stephanie Wu
(74) *Attorney, Agent, or Firm* — Schwegman Lundberg & Woessner, P.A.

(57) ABSTRACT

A fetch process for a computing system is described herein. The computing system comprises a non-transitory memory. In the non-transitory memory, instructions are stored in Cycle-Redundancy Blocks (CRC blocks). Each of these CRC blocks comprises a first CRC code associated with the instructions stored in the CRC block. During a fetch process, the computing system generates a second CRC code based on the instructions stored in the CRC block and compares the second CRC code with the first CRC code to ascertain the success of the fetch process.

9 Claims, 7 Drawing Sheets

FIG. 3

SYSTEMS AND METHODS FOR FETCHING AND WRITING INSTRUCTIONS TO MEMORY

CROSS REFERENCE TO RELATED APPLICATION

This application claims priority to and incorporates by reference Chinese patent application no. 202410218254.4 filed 27 Feb. 2024.

TECHNICAL FIELD

The present disclosure relates to computing systems and, more particularly, to Execute-in-Place (XiP) systems.

BACKGROUND

In Execute-in-Place (XiP) systems, such as those involved in Internet-of-Things (IoTs), Systems on Chips (SoCs), instructions are stored in a Flash memory. One or more processors of these computing systems fetch instructions directly from the Flash memory. However, under specific conditions, such as high-frequency fetching, operating in environments with high temperature and pressure, or operating with electromagnetic interferences, there exists a certain probability of errors in fetching from the Flash memory. These errors may result in logical errors and system crashes. The instructions fetched may be inconsistent with the instructions actually stored in the Flash memory. Therefore, it is desirable for computing systems to provide a mechanism in place to confirm if a fetch process is successful; that is, the instructions fetched match the instructions stored in Flash memories.

BRIEF SUMMARY

A method for fetching and writing instructions to memory involves receiving a fetch request for one or more instructions located at one or more virtual read addresses from one or more processors, the one or more virtual read addresses corresponding to one or more physical read addresses of a Flash memory; converting the one or more virtual read addresses to the one or more physical read addresses; reading the one or more instructions located at the one or more physical read addresses of the Flash memory to a First-In, First-Out (FIFO) storage; reading a first Cyclic redundancy check (CRC) code associated with the one or more instructions; calculating a second CRC code based on the one or more instructions; comparing the first CRC code and the second CRC code; and determining a fetch process is successful based on the first CRC code is equal to the second CRC code.

In an embodiment, a computing apparatus comprises a processor, a Flash controller, and a memory storing instructions that, when executed, configure the apparatus to perform these steps.

In another embodiment, a non-transitory computer-readable storage medium contains instructions that, when executed by a computer, causes the computer to perform these steps.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a conceptual diagram illustrating memory organization in Flash memory 106, according to some examples.

DETAILED DESCRIPTION

A computing system 100 may include various internal and/or external components which contribute to functions of the computing system 100. In some examples, a computing system 100 is an Execute-in-Place (XiP) system. XiP systems are commonly found in System-on-Chip (SoC) and Internet of Things (IoT) devices. In these examples, the XiP system allows instructions to be fetched and executed directly from non-volatile memories (e.g., Flash memory 106) without the need for copying the instructions to a Random Access Memory (RAM) first. This leads to reduced memory requirements and is beneficial in resource-constrained environments. In some examples, in a XiP system, a non-transitory memory (e.g., the Flash memory 106) is managed by a controller (e.g., the Flash controller 104), which ensures the reliable fetching from and writing to the non-transitory memory.

Figure 1:
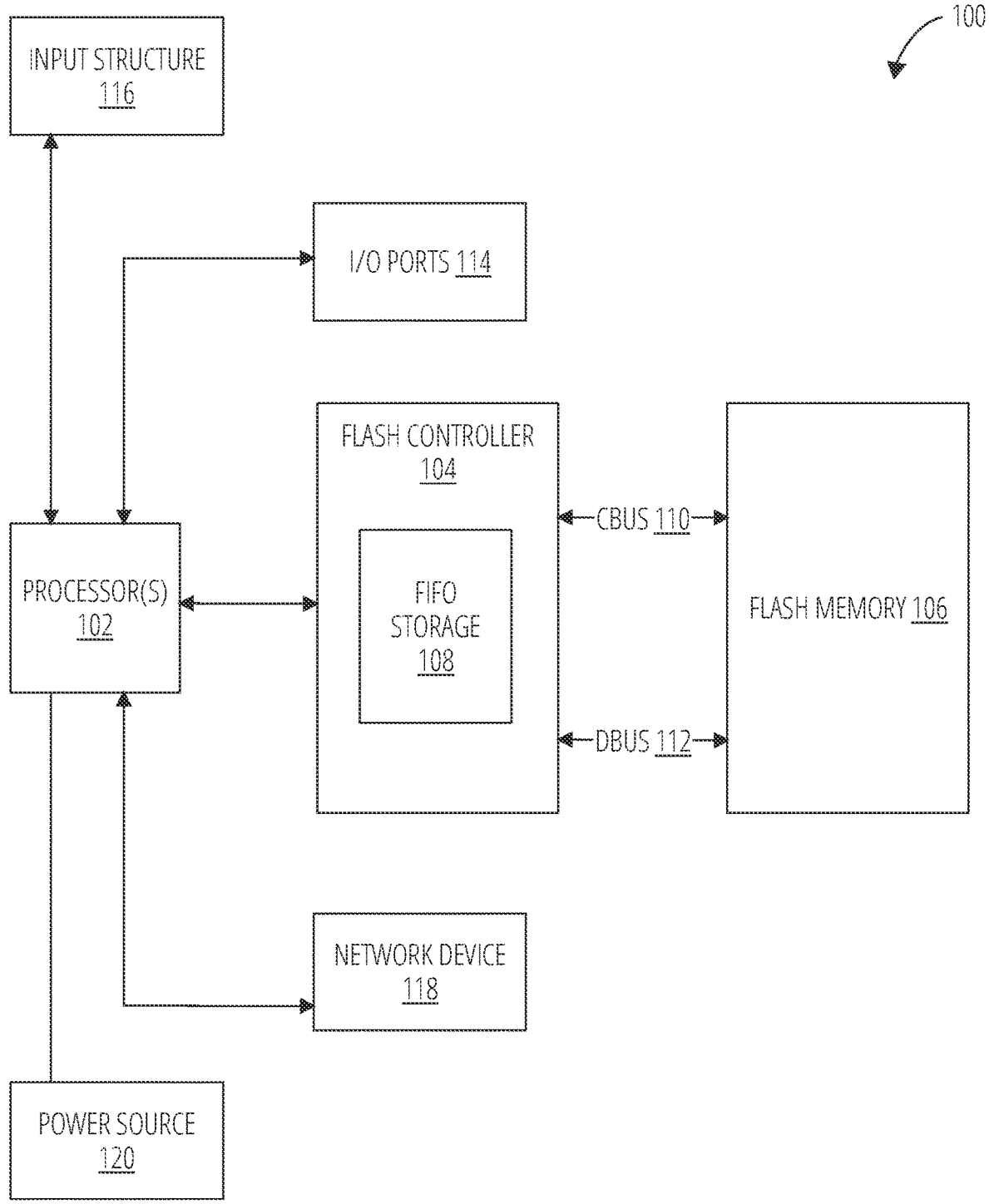
FIG. 1 is a block diagram illustrating the components that may be present in a computing system 100, according to some examples.

FIG. 1 is a block diagram illustrating the components that may be present in a computing system 100, according to some examples. The components may allow the computing system 100 to function in accordance with the techniques discussed herein. As will be appreciated, the various functional blocks shown in FIG. 1 may include hardware elements (including application specific or generic circuitry), software elements (including computer code stored on a machine-readable medium) or a combination of both hardware and software elements. It should further be noted that FIG. 1 is merely one example of a particular implementation and is merely intended to illustrate the types of components that may be present in a computing system 100. For example, the components include one or more processors 102, a Flash controller 104, and a Flash memory 106, one or more I/O ports 114, one or more input structure(s) 116, one or more network devices 118, and a power source 120. The Flash controller 104 is coupled to the one or more processors 102, and the Flash controller 104 is coupled to the Flash memory 106 via a control bus (cbus) 110 and a data bus (dbus) 112. The Flash controller 104 further comprises a First-in, First-out (FIFO) storage 108. The one or more processors 102 are coupled to the one or more I/O ports 114, the one or more input structure(s) 116, the one or more network devices 118, and the power source 120.

The one or more processors 102 may provide data processing capability to execute the operating system, programs, user and application interfaces, and any other functions of the computing system 100. The one or more processors 102 may include one or more microprocessors, such as one or more "general-purpose" microprocessors, one or more special-purpose microprocessors and/or ASICS, or some combination of such processing components. In some examples, the one or more processors 102 further include one or more microcontrollers, as well as graphics processors, video processors, audio processors and/or related chip sets.

The Flash controller 104 may be a hardware device or a microcontroller that manages the storage and retrieval of instructions or data to and from the Flash memory 106. In some examples, the Flash controller 104 comprises a communication interface for receiving instructions and data. In some examples, the Flash controller 104 comprises a processing circuit for controlling write processes and fetch processes to write/fetch instructions/data using techniques described herein. In some examples, the Flash controller 104 causes external processing circuits (e.g., the one or more processors 102) to perform operations related to Flash memory 106 management, such as to perform write/fetch instructions/data using techniques described herein. In some additional examples, the Flash controller 104 uses a combination of the processing circuit and external processing circuits to perform operations related to Flash memory 106 management.

The Flash memory 106 is a non-volatile storage medium that can be electrically erased and reprogramed and provides persistent storage of data and/or instructions. In some examples involving XiP systems, the Flash memory 106 stores one or more instructions to be executed by the one or more processors 102 and/or data for implementing various functions of the computing system 100, such as application or program code, data associated with the applications or programs, operating system code.

In some examples, the Flash memory 106 stores one or more instructions to be executed by the one or more processors 102. The one or more processors 102 fetch the one or more instructions by sending a fetch request to the Flash controller 104. The Flash controller 104 performs a fetch process to read the one or more instructions from the Flash memory 106, store the one or more instructions in the FIFO storage 108, and return the one or more instructions to the one or more processors 102 for execution. In some examples, the fetch request sent by the one or more processors 102 comprises a virtual read address that corresponds to a physical read address in the Flash memory 106. In some examples, Flash controller 104 fetches the one or more instructions from the Flash memory 106 via the control bus (cbus) and fetches data from the Flash memory 106 via the data bus (dbus).

Due to errors triggered by various factors such as fetching in high-frequency, in environments with high temperature and pressure, or fetching when there are electromagnetic interferences, the one or more instructions fetched (i.e., the one or more instructions stored in the FIFO storage 108 to be executed by the one or more processors) may be different from the one or more instructions actually stored in the Flash memory 106. To solve this issue, the computing system 100 may use a Cyclic redundancy check (CRC) technique to detect the errors when they occur. In some examples, the one or more instructions are associated with a first CRC code. During a fetch process, after fetching the one or more instructions from the Flash memory 106, the Flash controller 104 calculates a second CRC code based on the one or more instructions fetched. If the one or more instructions fetched are the same as the one or more instructions stored in the Flash memory 106, the first CRC code should be the same as the second CRC code. If the one or more instructions fetched differ from the one or more instructions stored in the Flash memory 106, the first CRC code would be different from the second CRC code, indicating an unsuccessful fetch process. By comparing the first CRC code and the second CRC code during a fetch process, the computing system 100 may verify the success of the fetch process and detect errors in the fetch process.

In some examples, the one or more processors 102 sends a write request to the Flash controller 104. The Flash controller 104 performs a write process to write the one or more instructions to the FIFO storage and write the one or more instructions in the FIFO storage to the Flash memory 106. To use the CRC technique, the first CRC code corresponding to the one or more instructions may be generated and stored in the Flash memory 106 together with the one or more instructions during the write process. In some examples, the Flash controller 104 calculates the first CRC code associated with the one or more instructions and stores the first CRC code together with the one or more instructions in the Flash memory 106. The first CRC code generated in the write process may be referenced as a third CRC code to differentiate it from the first CRC code utilized in the fetch process. In some examples, the write request sent by the one or more processors 102 comprises a virtual write address that corresponds to a physical write address in the Flash memory 106.

The I/O ports 114 may include ports configured to connect to a variety of external devices, such as a power source 120 or other electronic devices (such as handheld devices and/or computers, printers, projectors, external displays, modems, docking stations, and so forth). The I/O ports 114 may support any standard or proprietary interface type, such as a universal serial bus (USB) port, a video port, a serial connection port, a FireWire port, an ethernet or modem port, and/or an AC/DC power connection port.

The input structure(s) 116 may include the various devices, circuitry, and pathways by which input or feedback is provided to data processing circuitry, such as the one or more processors 102. Such input structure(s) 116 may be configured to control a function of the computing system 100 when actuated. For examples, the input structure(s) 116 may include buttons, sliders, switches, control pads, keys, knobs, scroll wheels, keyboards, mice, touchpads, and so forth. In some examples, the input structure(s) 116 may also include such components as global positioning system (GPS) circuitry and/or accelerometers that convey information about the location and/or orientation of the computing system 100 to the one or more processors 102.

The network device 118, such as a network controller or a network interface card (NIC). In some examples, the network device 118 may be a wireless NIC providing wireless connectivity over any 802.11 standard or any other suitable wireless networking standard. The network device 118 may allow the computing system 100 to communicate over a network, such as a Local Area Network (LAN), Wide Area Network (WAN), cellular network, or the Internet. Further, the computing system 100 may connect to and send or receive data with any device on the network, such as portable electronic devices, personal computers, printers, and so forth.

The power source 120 may be one or more batteries, such as a lithium-ion polymer battery. The battery may be userremovable or may be secured within the housing of the computing system 100 and may be rechargeable. Additionally, the power source 120 may include AC power, such as provided by an electrical outlet, and the computing system 100 may be connected to the power source 120 via a power adapter. This power adapter may also be used to recharge one or more batteries if present.

Figure 2:
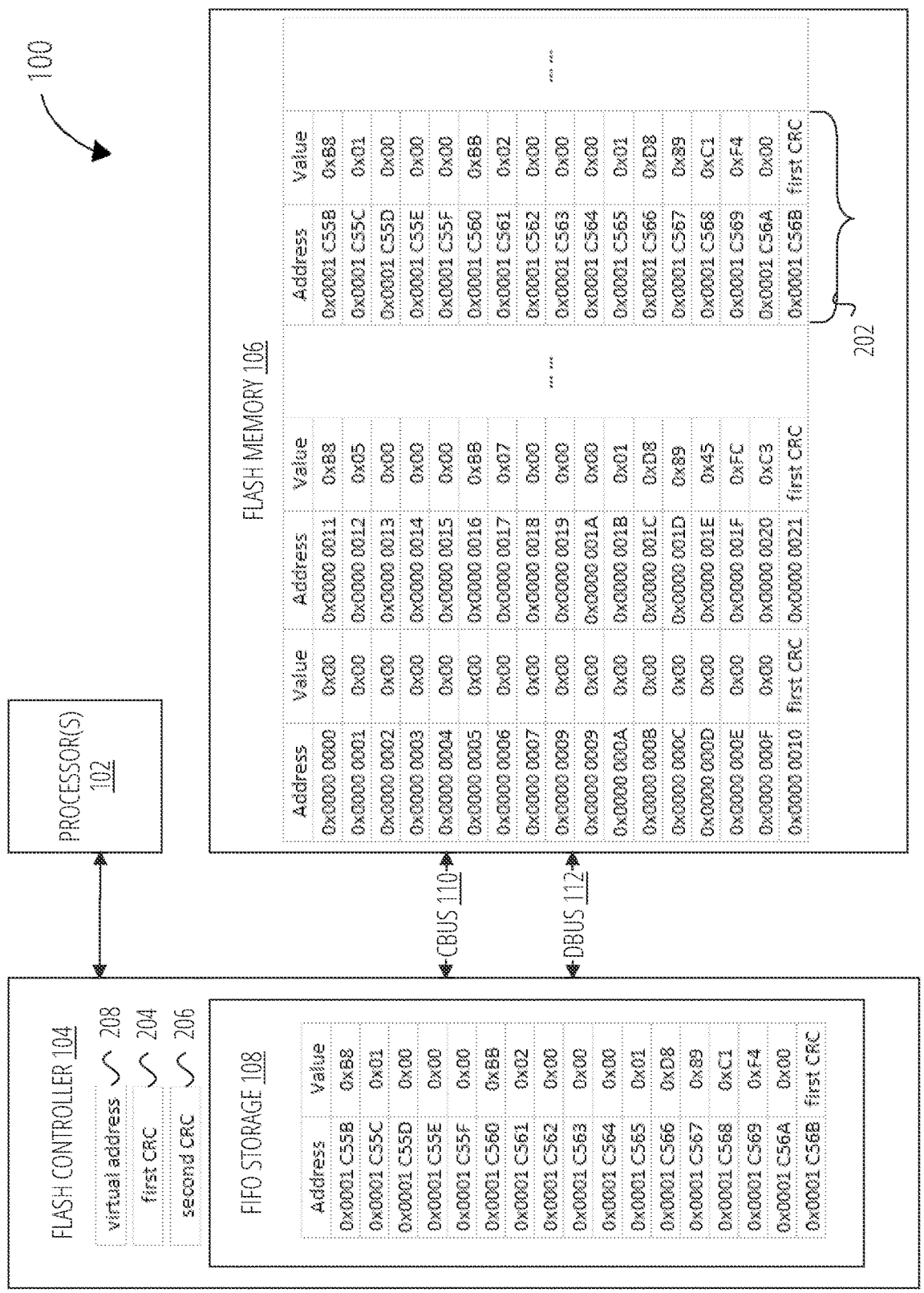
FIG. 2 is a conceptual diagram illustrating the FIFO storage of the Flash controller and CRC blocks of the Flash memory of the computing system 100, according to some examples.

FIG. 2 is a conceptual diagram illustrating the FIFO storage of the Flash controller and CRC blocks of the Flash memory of the computing system 100, according to some examples.

As explained in the description to FIG. 1, the Flash memory 106 provides persistent storage of data and/or instructions. In some examples, the Flash memory 106 comprises a plurality of memory locations. Each of the plurality of memory locations holds a value and comprises a corresponding physical address. The value is either an instruction or a data (e.g., a first CRC code). A size of the value is 1 byte. The physical address corresponds to a virtual address. The Flash controller 104 may use physical addresses to locate where instructions/data are stored and where new instructions/data should be written. The one or more processors 102 use virtual addresses to locate where instructions/data are stored and where new instructions/data should be written. In FIG. 2, for the purposes of discussion, all addresses are in hexadecimal notation, and all the addresses in the Flash memory 106 are physical addresses. A starting physical address for the Flash memory 106 is 0x00000000, but in practice, the starting physical address may start at a higher address like 0x08000000.

In some examples, the plurality of memory locations are grouped into a plurality of CRC blocks. A size of the CRC block is determined by either a length of a CPU cache line or a size of the FIFO storage 108. In the example illustrated in FIG. 2, pairs of columns designated with "Physical address" and "Value" headers represent a CRC block. A size of each CRC block is 16 bytes, indicating its capacity to hold 16 separate 1-byte instructions/data. It should be noted, however, that the actual byte size of each CRC block totals to 17 bytes, considering that the CRC code occupies one memory location, which is also 1-byte.

The Flash controller 104 may receive a fetch request comprising a virtual address (e.g., virtual address 208) from the one or more processors 102. The Flash controller 104 may convert the virtual address to a physical address to identify the memory location. As illustrated in FIG. 2, a memory location can be identified by its physical address 0x0001C55B, the memory location comprises an instruction, 0xB8, which stands for MOV in x86 systems.

The Flash controller 104 converts a virtual address to a physical address based on the size of the CRC block. In some examples in which the size of the CRC block is 16 bytes, the Flash controller 104 converts the physical read address using the following formula: physical address=virtual address+(virtual address>>4). The operator ">>" denotes a bitwise right shift; ">>4" signifies the division of the virtual address by 2^4 (or 16), and the residual is disregarded. The virtual address is divided by 16 because an additional CRC code (e.g., first CRC code) is added to the Flash memory 106 every 16 bytes. The result of virtual address>>4 acts as an offset; the result of the division is then added to the original virtual address to produce the physical address. For example, to convert a virtual address of 0x0001AAB0 into the corresponding physical address: physical address=0x0001AAB0+(0x0001AAB0>>4) =0x0001AAB0+0x00001AAB=0x0001C55B.

The Flash controller 104 stores a CRC block associated with the physical address in the FIFO storage 108. As illustrated in FIG. 2, in response to identifying the physical address 0x0001C55B, the Flash controller 104 copies one or more instructions of the CRC block associated with the physical address 0x0001C55B (e.g., 202) and stores the one or more instructions to the FIFO storage 108.

The Flash controller 104 calculates a second CRC code (e.g., 206) based on the one or more instructions using various known methods. The second CRC code is compared with the first CRC code (e.g., 204) to verify the success of the fetch process. In some examples, the first CRC code is found in physical address 0x0001C56B of the CRC block.

It should be emphasized that the instructions and data values illustrated in FIG. 2 are merely demonstrative examples, utilized with the intent of clarifying the workings of the computing system 100. The actual instructions and data values in practice may vary depending on specific configurations of the computing system 100.

Figure 3:
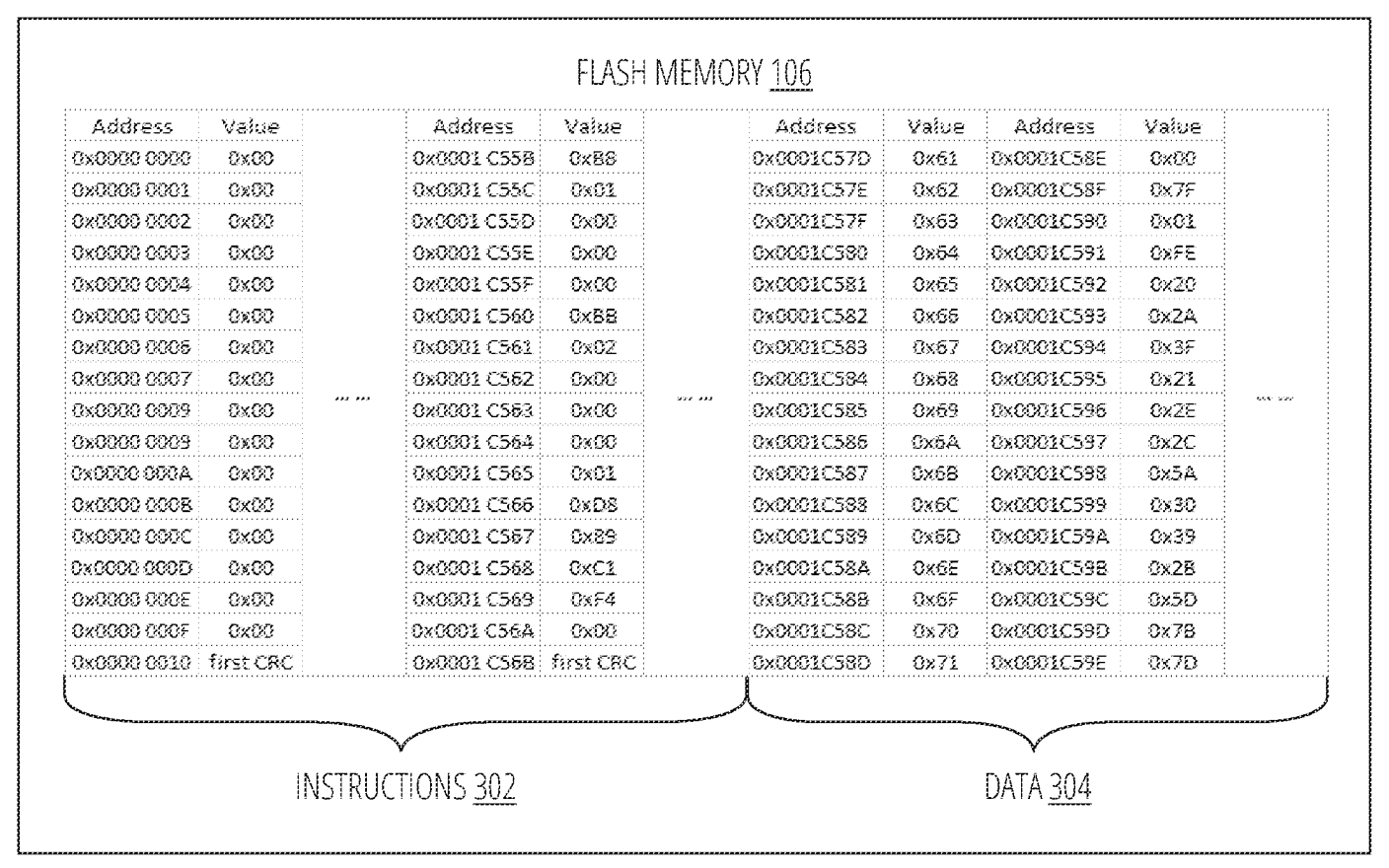

FIG. 3 is a conceptual diagram illustrating memory organization in Flash memory 106, according to some examples. The Flash memory 106 may store different types of information (e.g., Instructions and data). The Flash memory 106 may comprise of two or more partitions, with at least one designated for storing instructions and another designated for storing data. In some examples, the partitions storing instructions are divided in CRC blocks comprising CRC codes. The partitions storing data are organized using conventional methods, that is, the partitions storing data does not comprise of CRC codes.

In some examples, the Flash memory 106 comprises of two partitions, one for storing instructions (e.g., 302) and the other for storing data (e.g., 304). In these examples, the partition storing instructions (e.g., 302) is placed in a memory location where an offset is 0, that is, a virtual address of the memory location is divisible by the size of a CRC block (e.g., 16). For example, memory location 0x0001AAB0 is a memory location where an offset is 0 because 0x0001AAB0 is divisible by 16, given the size of a CRC block is 16. The partition storing data is placed in a different end of the Flash memory 106. As illustrated in FIG. 3, the partition 302 does not overlap with the partition 304.

In some examples, the Flash memory 106 comprises a plurality of images. Each of the plurality of images comprises both instructions and data. The Flash controller 104 combines the instructions from each of the plurality of images by placing them in one or more CRC blocks. The one or more CRC blocks starts in a memory location in the Flash memory 106 where the offset is 0, that is, a memory location's corresponding virtual address is divisible by the size of the one or more CRC blocks. The computing system 100 adds CRC codes to each of the one or more CRC blocks. The computing system 100 combines the data from each of the plurality of images by placing them in an opposite end of the Flash memory 106.

It should be emphasized that the instructions and data values illustrated in FIG. 3 are merely demonstrative examples, utilized with the intent of clarifying the workings of the Flash memory 106. The actual instructions and data values in practice may vary depending on specific configurations of the computing system 100.

Figure 4:
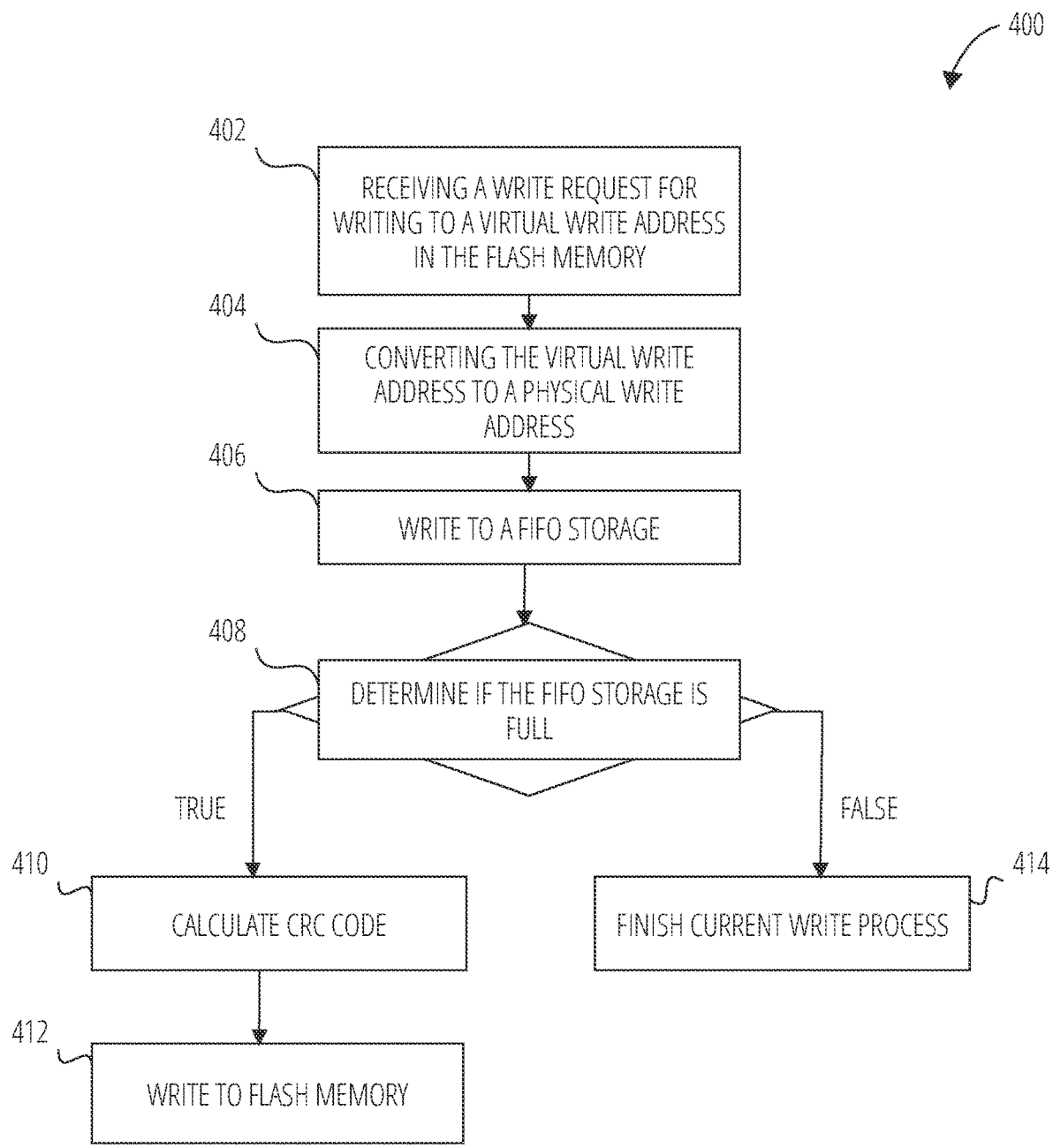
FIG. 4 is a flowchart illustrating operations of a computing system 100 in performing a write process to the Flash memory 106, according to some examples.

FIG. 4 is a flowchart illustrating operations of a computing system 100 in performing a write process to the Flash memory 106, according to some examples. The method 400 may be embodied in computer-readable instructions for execution by the one or more processors such that operations of the method 400 may be performed in part or in whole by the functional components of the computing system 100; accordingly, the method 400 is described below by way of example with reference thereto. However, it shall be appreciated that at least some of the operations of the method 400 may be deployed on various other hardware configurations than the computing system 100.

At operation 402, the computing system 100 receives, by a Flash controller 104, a write request for writing one or more instructions to a virtual write address in the Flash memory 106 from the one or more processors 102.

At operation 404, the computing system 100 converts the virtual write address to the physical write address. In some examples, at operation 404, the Flash controller 104 converts the virtual write address to the physical write address based on the size of the CRC block. In some examples in which the size of the CRC block is 16 bytes, the Flash controller 104 converts the physical write address using the following formula: physical write address=virtual write address+(virtual write address>>4). The operator ">>" denotes a bitwise right shift; ">>4" signifies the division of the virtual write address by 2^4 (or 16), and the residual is disregarded. For example, to convert a virtual write address of 0x0001AAB0 into the corresponding physical write address: physical write address=0x0001AAB0+ (0x0001AAB0>>4)=0x0001AAB0+ 0x00001AAB=0x0001C55B.

At operation 406, the computing system 100 writes the one or more instructions to a FIFO storage. The Flash controller 104 may write the one or more instructions to the FIFO storage until either the current write process for writing the one or more instructions would fill up the FIFO storage (i.e., reaches the FIFO storage's maximum capacity) or all of the one or more instructions have been written into the FIFO storage. In some examples, if there are more instructions that need to be written into the FIFO storage than the capacity of the FIFO storage, then the computing system 100 proceeds to operation 410.

At operation 408, the computing system 100 determines whether the FIFO storage is full in response to finishing writing of one or more instructions to the FIFO storage. If the Flash controller 104 determines that the FIFO storage is full, computing system 100 continues to operation 410; if the Flash controller 104 determines that the FIFO storage is not full, the write process is considered finished.

At operation 410, the computing system 100 calculates a CRC code associated with the one or more instructions written into the FIFO storage. In response to storing the one or more instructions in the FIFO storage 108, the Flash controller 104 calculates a CRC code based on the one or more instructions using various known methods for calculating the CRC codes. In some examples, the CRC code is calculated before storing the one or more instructions in the FIFO storage 108. In some examples, the CRC code calculated during a write process is referred to as a third CRC code.

At operation 412, the one or more instructions in the FIFO storage and the CRC code calculated at operation 410 get written into the Flash memory. In some examples, the one or more instructions are written into the Flash memory via the cbus 110. In some examples, the write process may involve writing data instead of writing the one or more instructions to the Flash memory. Data is written to the Flash memory via the dbus 112.

At operation 414, the current write process is considered finished if the determination at operation 408 is False (i.e., FIFO storage is not full, but all of the one or more instructions have been written into the FIFO storage 108). In some examples, even without completely filling the FIFO storage 108, the method 400 proceeds to operations 410 and 412 to calculate a CRC code to ensure that the one or more instructions are written in a CRC block accurately and uninterruptedly before moving onto a next CRC block or before conducting other operations (e.g., a fetch process), preventing the one or more instructions from being corrupted by extraneous information.

Figure 5:
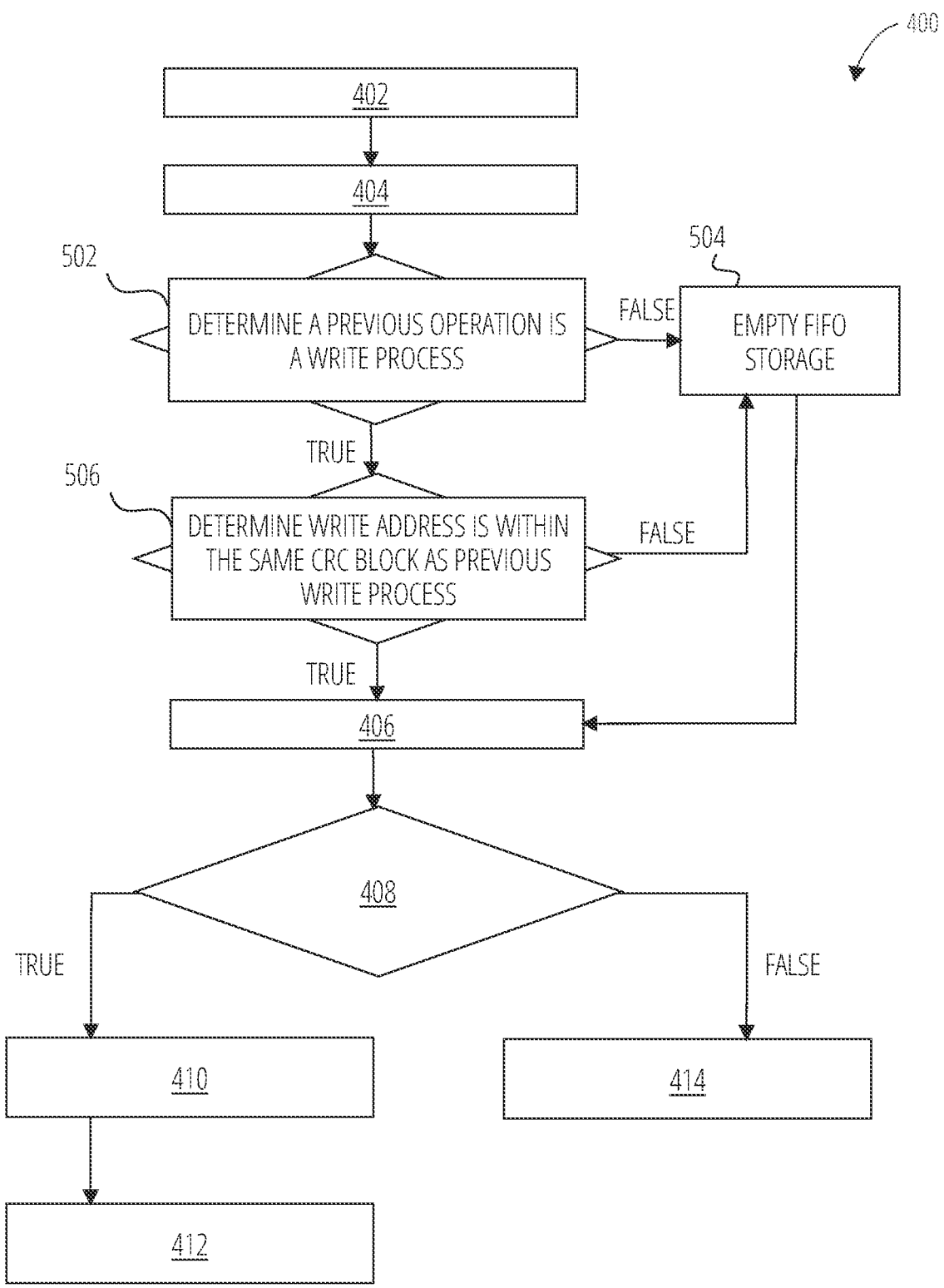
FIG. 5 is a flowchart illustrating further details of the write process to the Flash memory 106, according to some examples.

FIG. 5 is a flowchart illustrating further details of the write process to the Flash memory 106, according to some examples. Method 400 may further comprise of operations 502, 504, and 506.

At operation 502, the computing system 100 determines whether a previous operation is a write process. If the previous operation is not a write process (i.e., returning "FALSE"), the computing system 100 executes operation 504. At operation 504, the computing system 100 empties the FIFO storage 108, making rooms available for new instructions. On the other hand, if the previous operation is a write process, the computing system 100 moves to executes operation 506.

At operation 506, the computing system 100 determines whether the physical write address is within a same CRC block as a previous write process, that is, whether the CRC block currently in the FIFO storage 108 comprises of the physical write address to which the computing system 100 is currently writing. If the physical write address is within the same CRC block as the previous write process, the computing system 100 proceeds to execute operation 406, that is, writing the one or more instructions to the FIFO storage 108. If the physical write address is not within the same CRC block as previous write process, that is, the CRC block currently in the FIFO storage 108 does not comprise of the physical write address to which the computing system 100 is currently writing, the computing system 100 proceeds to perform operation 504, emptying the FIFO storage 108, before performing operation 406.

Figure 6:
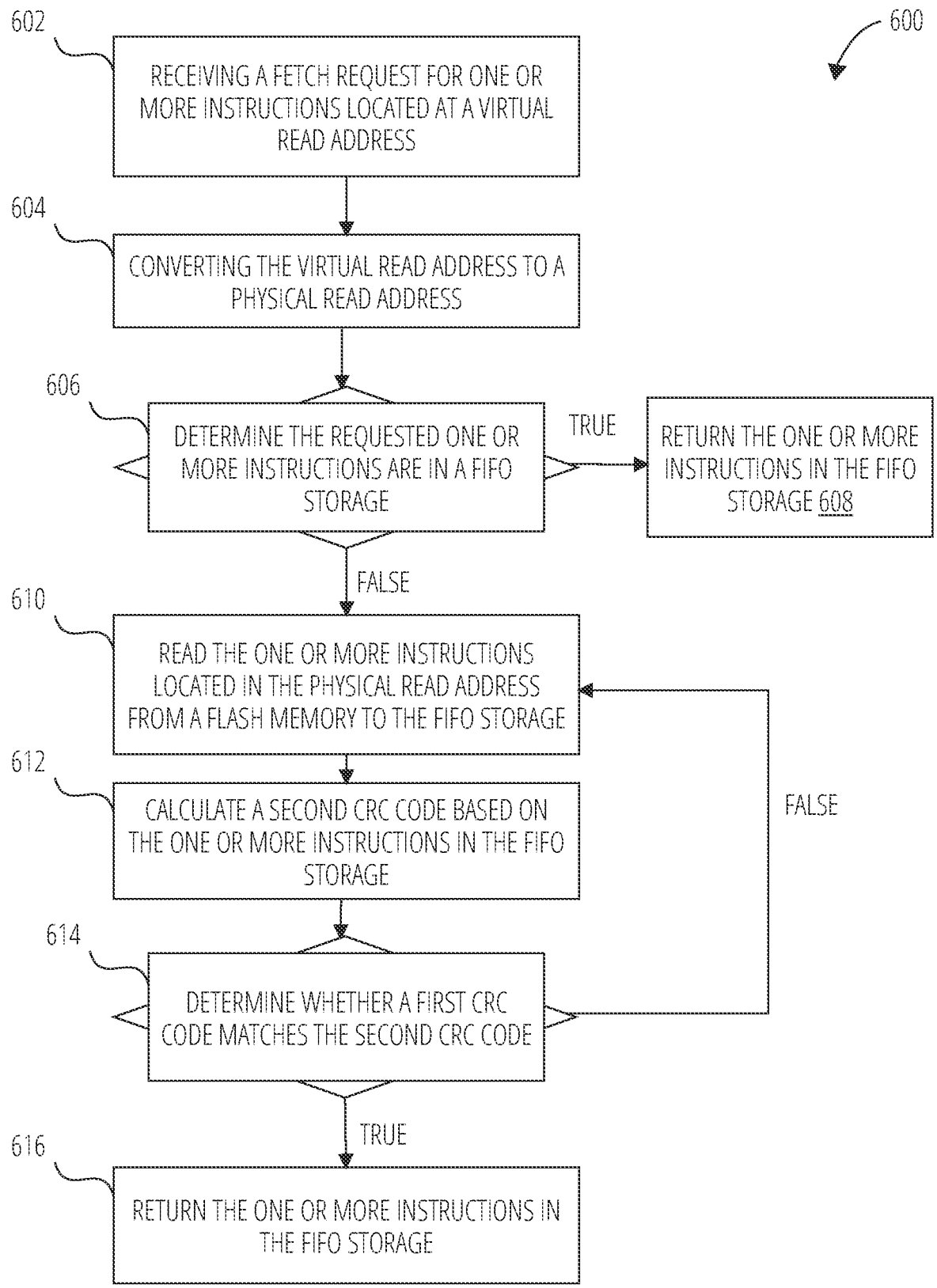
FIG. 6 is a flowchart illustrating a fetch process from the Flash memory 106, according to some examples.

FIG. 6 is a flowchart illustrating a fetch process from the Flash memory 106, according to some examples.

At operation 602, the computing system 100 receives a fetch request for one or more instructions located at a virtual read address from the one or more processors 102.

At operation 604, the computing system 100 converts the virtual read address to a physical read address in response to receiving the fetch request from the one or more processors 102. In some examples, the fetch request is requesting for an instruction located at a virtual read address, 0x0001AAC0. The Flash controller 104 converts the virtual read address to a corresponding physical read address, 0x0001C55B.

The computing system 100 converts a virtual read address to a physical read address based on the size of the CRC block. In some examples in which the size of the CRC block is 16 bytes, the Flash controller 104 converts the physical read address using the following formula: physical read address=virtual read address+(virtual read address>>4). The operator ">>" denotes a bitwise right shift; ">>4" signifies the division of the virtual address by 2^4 (or 16), and the residual is disregarded. The virtual read address is divided by 16 because an additional CRC code (e.g., first CRC code) is added to the Flash memory 106 every 16 bytes. The result of virtual read address>>4 acts as an offset; the result of the division is then added to the original virtual read address to produce the physical read address. For example, to convert a virtual read address of 0x0001AAB0 into the corresponding physical read address: physical read address=0x0001AAB0+(0x0001AAB0>>4) =0x0001AAB0+0x00001AAB=0x0001C55B.

At operation 606, the computing system 100 determines whether the one or more instructions requested are in the FIFO storage. If true, the fetch process 600 continues to operation 608. If false, the fetch process 600 continues to operation 610. In some examples, the one or more instructions requested have already been in the FIFO storage 108 of the Flash controller 104 from previous fetch processes, it is unnecessary to read from the Flash memory 106 again, so the computing system 100 continues to perform operation 608. At operation 608, the Flash controller 104 returns the one or more instructions requested in the FIFO storage to the one or more processors for execution.

At operation 610, the computing system 100 reads the one or more instructions located in the physical read address from the Flash memory 106 to the FIFO storage 108. In some examples, the entire CRC block comprising the one or more instructions (determined by the physical read address) is copied to the FIFO storage 108. As illustrated in FIG. 2, if the one or more instructions are located in physical read addresses at 0x0001C560 and 0x0001C561, the entire CRC block 202 is copied to the FIFO storage 108.

At operation 612, the computing system 100 calculates a second CRC code based on the one or more instructions in the FIFO storage 108 using various known methods (e.g., CRC-16-CCITT, CRC-16-IBM).

At operation 614, the computing system 100 determines whether the first CRC code matches the second CRC code. If the first CRC code is equal to the second CRC code, it means the one or more instructions are fetched correctly and the fetch process is successful, and the computing system 100 continues to operation 616. At operation 616, the computing system 100 returns the one or more instructions requested in the FIFO storage 108 to the one or more processors for execution. If the first CRC code is different from the second CRC code, indicating an unsuccessful fetch process, the computing system 100 performs operation 610 again. At operation 610, the computing system 100 reads the one or more instructions from the Flash memory 106 to the FIFO storage 108. It should be understood that the one or more instructions involved in the write process may be different or the same as the one or more instructions involved in the fetch process.

Figure 7:
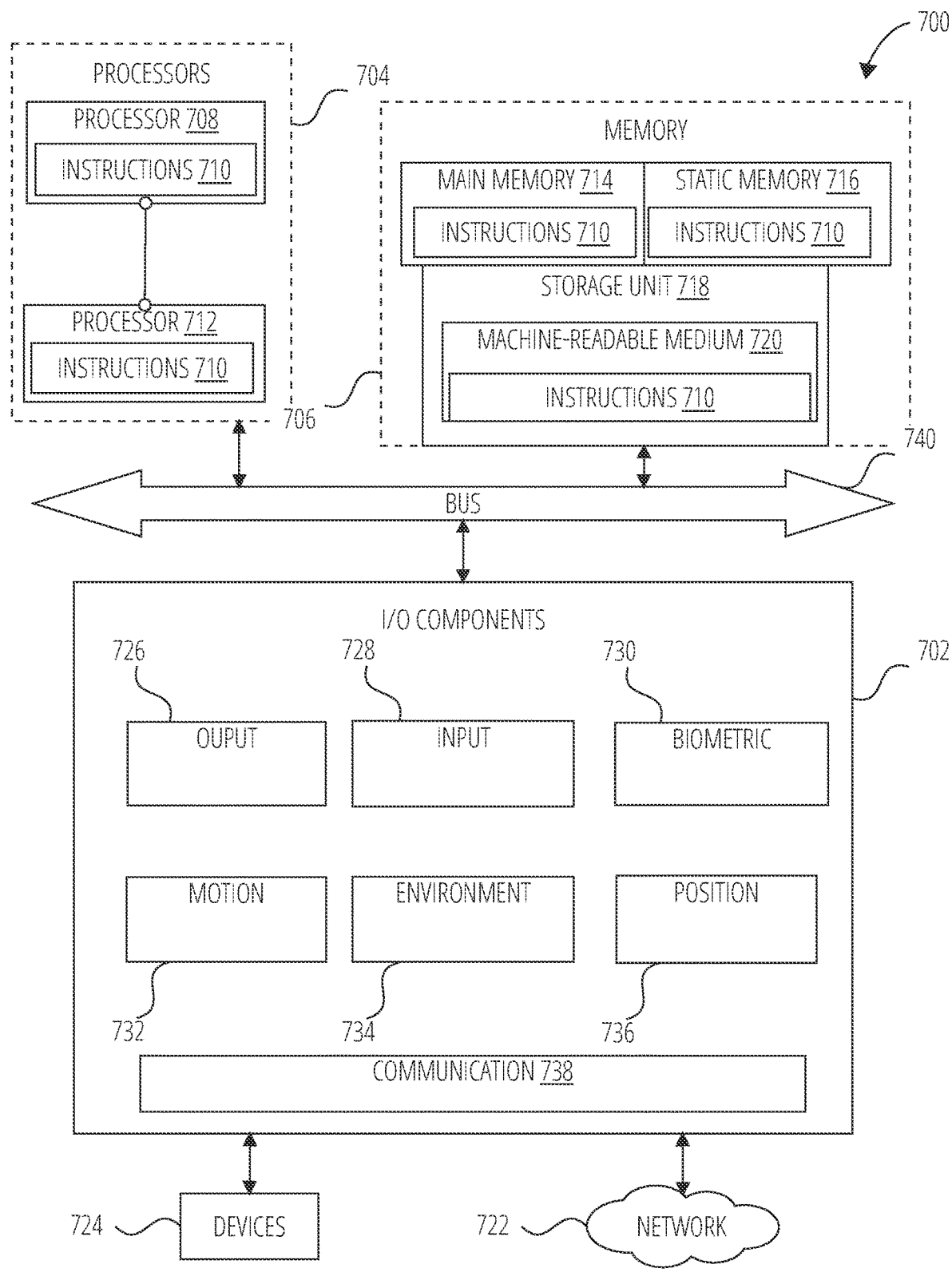
FIG. 7 is a diagrammatic representation of the computing system 700 within which instructions 710 for causing the computing system 700 to perform any one or more of the methodologies discussed herein may be executed, according to some examples.

FIG. 7 is a diagrammatic representation of the computing system 700 within which instructions 710 (e.g., software, a program, an application, an applet, an app, or other executable code) for causing the computing system 700 to perform any one or more of the methodologies discussed herein may be executed, according to some examples. For example, the instructions 710 may cause the computing system 700 to execute any one or more of the methods described herein. The instructions 710 transform the general, non-programmed computing system into a particular machine computing system 700 programmed to carry out the described and illustrated functions in the manner described. The computing system 700 may operate as a standalone device or be coupled (e.g., networked) to other machines. In a networked deployment, the computing system 700 may operate in the capacity of a server machine or a client machine in a server-client network environment, or as a peer machine in a peer-to-peer (or distributed) network environment. The computing system 700 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the computing system 700. Further, while a single computing system 700 is illustrated, the term "computing system" may include a collection of machines that individually or jointly execute the instructions 710 to perform any one or more of the methodologies discussed herein.

The computing system 700 may include processors 704, memory 706, and I/O components 702, which may be configured to communicate via a bus 740. In some examples, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 708 and a Processor 712 that execute the instructions 710. The term "Processor" is intended to include multi-core processors that may comprise two or more independent processors (sometimes referred to as "cores") that may execute instructions contemporaneously. Although FIG. 7 shows multiple processors 704, the computing system 700 may include a single processor with a single core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 714, the static memory 716, and storage unit 718 store the instructions 710 embodying any one or more of the methodologies or functions described herein. The instructions 710 may also reside, wholly or partially, within the main memory 714, within the static memory 716, within machine-readable medium 720 within the storage unit 718, within the processors 704 (e.g., within the processor's cache memory), or any suitable combination thereof, during execution thereof by the computing system 700.

The I/O components 702 may include various components to receive input, provide output, produce output, transmit information, exchange information, or capture measurements. The specific I/O components 702 included in a particular machine depend on the type of machine. For example, portable machines such as mobile phones may include a touch input device or other such input mechanisms, while a headless server machine will likely not include such a touch input device. The I/O components 702 may include many other components not shown in FIG. 7. In various examples, the I/O components 702 may include output components 726 and input components 728. The output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 732 include acceleration sensor components (e.g., accelerometer), gravitation sensor components, rotation sensor components (e.g., gyroscope). The environmental components 734 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 736 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the computing system 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, or location via detecting an NFC beacon signal that may indicate a particular location.

The various memories (e.g., main memory 714, static memory 716, and/or memory of the processors 704) and/or storage unit 718 may store one or more sets of instructions and data structures (e.g., software) embodying or used by any one or more of the methodologies or functions described herein. These instructions (e.g., the Instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

EXAMPLES

Example 1 is a method including receiving, by a Flash controller, a fetch request for one or more instructions located at one or more virtual read addresses from one or more processors, the one or more virtual read addresses corresponding to one or more physical read addresses of a FLASH memory; converting, by the Flash controller, the one or more virtual read addresses to the one or more physical read addresses; reading, by the Flash controller, the one or more instructions located at the one or more physical read addresses of the Flash memory to a FIFO storage; reading, by the Flash controller, a first CRC code associated with the one or more instructions; calculating, by the Flash controller, a second CRC code based on the one or more instructions; comparing, by the Flash controller, the first CRC code and the second CRC code; and determining, by the Flash controller, a fetch process is successful based on the first CRC code is equal to the second CRC code.

In Example 2, the subject matter of Example 1 including determining the fetch process is unsuccessful based on the first CRC code being different from the second CRC code; and performing both of the readings, the calculating, the comparing, and the determining again.

In Example 3, the subject matter of Examples 1-2 including receiving, by the Flash controller, a write request for writing one or more second instructions to one or more virtual write addresses in the Flash memory from the one or more processors; converting, by the Flash controller, the one or more virtual write addresses to one or more physical write addresses; determining, by the Flash controller, a previous operation is a previous fetch process; emptying, by the Flash controller, the FIFO storage; writing, by the Flash controller, the one or more second instructions to the FIFO storage; calculating, by the Flash controller, a third CRC code associated with the one or more second instructions; and writing, by the Flash controller, the one or more second instructions from the FIFO storage and the third CRC code to the one or more physical write addresses of the Flash memory.

In Example 4, the subject matter of Examples 1-3 including receiving, by the Flash controller, a write request for writing one or more second instructions to one or more virtual write addresses in the Flash memory from the one or more processors; converting, by the Flash controller, the one or more virtual write addresses to one or more physical write addresses; determining, by the Flash controller, a previous operation is a previous write process; determining, by the Flash controller, the previous write process is performed on a same CRC block based on the one or more physical write addresses; and writing, by the Flash controller, the one or more second instructions to the FIFO storage.

In Example 5, the subject matter of Examples 1~4 including calculating, by the Flash controller, a third CRC code associated with the one or more second instructions based on a current write process would fill up the FIFO storage; and writing, by the Flash controller, the one or more second instructions from the FIFO storage and the third CRC code to the one or more physical write addresses of the Flash memory.

In Example 6, the subject matter of Examples 1-5 including determining, by the Flash controller, the previous write process is performed on a different CRC block based on the one or more physical write addresses; and emptying, by the Flash controller, the FIFO storage.

In Example 7, the subject matter of Examples 1-6 wherein the writing the one or more second instructions to the FIFO storage is uninterrupted by other operations and fills up a CRC block.

In Example 8, the subject matter of Examples 1-7 including determining each of the one or more physical read addresses using a following formula: physical read address=virtual read address+(virtual read address>>4).

In Example 9, the subject matter of Examples 1-8 including determining each of the one or more physical write addresses using a following formula: physical write address=virtual write address+(virtual write address>>4).

In Example 10, the subject matter of Examples 1-9 including a size of a CRC block is determined by one of a length of a CPU cache line and a capacity of a FIFO storage.

Example 11 is a computing system comprising means to implement of any of Examples 1-10.

Example 12 is a non-transitory computer-readable storage medium including instructions that when executed by a computer, cause the computer to implement of any of Examples 1-10.

Glossary

"A length of a CPU cache line" refers to a size of a CPU cache line, which is typically expressed in bytes. It may refer to of data/instructions that get transferred from main memory to cache during a single cache operation.

"Commands" refer to instructions.

"Computing system" refers to a set of hardware and software components designed to process data and execute instructions and provide a platform for running software applications.

"Control bus (cbus)" refers to a component of a computing system that is used to send and receive control signals/instructions within the computing system.

"Current write process" refers to an ongoing process where one or more processors or a computing system writes data or instructions to a specific location in memory or to a storage device (e.g., Flash memory).

"Data" refers to a collection of values of qualitative or quantitative variables. Data can be structured or unstructured and comes in many forms, including numbers, text, images, audio, video, etc. For instance, an employee's name, ID, and salary in a database, or the pixels of an image file, all represent data. Data is different from instructions, which tell a computing system what operations to perform.

"Data bus (dbus)" refers to a component of a computing system that is used to send and receive data within the computing system.

"Fetch process" refers to the operations where the processor retrieves instructions or data from memory for execution.

"Fetch request" refers to an operation where one or more processors request to retrieve (or "fetch") data from a certain location in memory. The fetch request specifies the memory address (e.g., virtual read address) from which the data should be retrieved. This operation is used when the one or more processors need to read the value of a variable or load an instruction for execution.

"FIFO storage" refers to a storage device that utilizes "First-In, First Out" method for organizing data. FIFO storage is used in buffering where it manages data packets or instructions in various kinds of hardware and software systems.

"Images" refers to complete copy of a system's state at a particular point in time. This can include the entire contents and structure of a storage device, such as a hard disk or a DVD. System images are often used for backup, system recovery, or duplicating setups across multiple machines. It may also refer to the contents of memory at a particular point in time.

"Instruction" refers to a command given to a computer to perform a specific operation. This operation could involve arithmetic, data manipulation, or control tasks. An instruction forms the basic unit of programming and tells the computer's processor what to do. Each instruction typically includes an opcode that specifies the operation to be performed (such as add, subtract, move data, jump to another instruction) and operands that provide data or locations of data on which the operation should act.

"Logical errors" refers to mistakes or flaws in a program's source code that lead to incorrect or unexpected behavior.

"Non-transitory memory" refers to media that have a persistent and durable storage. Examples of non-transitory media include hard drives, solid-state drives, Flash memory, CD-ROMs, DVDs, and other types of storage that maintain the stored information even when power is removed.

"Offset" refers to the distance between a particular memory location within a CRC block and a reference point that is a beginning of that CRC block. For example, refer to FIG. 2, a memory location with a physical address of 0x0001C560 has an offset of 5. Another memory location with a physical address of 0x0001C55B has an offset of 0 because it is the beginning of a CRC block.

"One or more microcontrollers" refer to one or more compact and self-contained computing devices that are designed to perform specific tasks within a larger system. They include integrated processor, memory, and input/output peripherals. One or more Microcontrollers are often used in embedded systems or devices, where they control a particular operation or process.

"Partition" refers to a subdivided section of a physical disk or memory that functions independently of other sections, providing a method for data or instructions organization. Partitions can exist on hard drives, Flash memory, and within databases, effectively dividing a larger storage space into smaller, manageable units that can be operated and managed separately.

"Physical address" refers to locations in the memory hardware (e.g., Flash memory) where data or instructions are stored. A physical address corresponds to real and tangible memory locations within a computing system's storage devices.

"Physical read address" refers to a physical address used during a fetch process.

"Physical write address" refers to a physical address used during a write process.

"Previous fetch process" refers to the last completed fetch process where the processor or system retrieved data or instruction from a specified location in memory or storage.

"Previous operation" refers to the last completed operation by the computing system involving either a fetch request or a write request.

"Previous write process" refers to the last completed write process where the processor or system wrote data or instruction to a specified location in memory or storage.

"Virtual address" refers to an address within a computing system's virtual address space used by one or more processors to fetch or write data or instructions. The memory accessed by the one or more processors is abstracted from the actual physical memory.

"Virtual read address" refers to a virtual address used in a fetch process. When the one or more processors send a fetch request, they use a virtual read address to represents a location within its virtual address space, but the actual data or instructions may be stored at a distinct location in physical memory. The distinct location in physical memory may be pinpointed by a corresponding physical address.

"Virtual write address" refers to a virtual address used in a write process. When the one or more processors send a write request, they use a virtual write address to represents a location within its virtual address space, but the actual data or instructions may be written to a corresponding location in physical memory. The corresponding location in physical memory is identified by a corresponding physical address.

"Write request" refers to an operation where one or more processors requests to store (or "write") data/instructions a certain location in memory. The write request specifies the memory address (e.g., virtual write address) where the data should be stored and the data that should be written to that location. This operation is used when the processor needs to save the results of a computation or update the value of a variable, for example.

"XiP system" refers to a computing system designed to support Execute-in-Place operations. It is often found in embedded systems where memory resources are limited. An XiP system allows programs to be executed directly from long-term storage (e.g., a Flash memory), instead of copying them into Random Access Memory (RAM) first. One or more processors of a XiP system may fetch instructions directly from a Flash memory for execution.

What is claimed is:

1. A method for writing and fetching instructions, comprising:
   receiving, by a Flash controller, a fetch request for one or more first instructions located at one or more virtual read addresses from one or more processors, the one or more virtual read addresses corresponding to one or more physical read addresses of a Flash memory;
   converting, by the Flash controller, the one or more virtual read addresses to the one or more physical read addresses;
   reading, by the Flash controller, the one or more first instructions located at the one or more physical read addresses of the Flash memory to a FIFO storage;
   reading, by the Flash controller, a first CRC code associated with the one or more first instructions;
   calculating, by the Flash controller, a second CRC code based on the one or more first instructions;
   comparing, by the Flash controller, the first CRC code and the second CRC code;
   determining, by the Flash controller, a fetch process is successful based on the first CRC code is equal to the second CRC code;
   receiving, by the Flash controller, a write request for writing one or more second instructions to one or more virtual write addresses in the Flash memory from the one or more processors;
   converting, by the Flash controller, the one or more virtual write addresses to one or more physical write addresses;
   determining, by the Flash controller, a previous operation is a previous write process;
   determining, by the Flash controller, the previous write process is performed on a same CRC block based on the one or more physical write addresses;
   writing, by the Flash controller, the one or more second instructions to the FIFO storage;
   calculating, by the Flash controller, a third CRC code associated with the one or more second instructions until the writing, by the Flash controller, the one or more second instructions to the FIFO storage fills up the FIFO storage;
   writing, by the Flash controller, the one or more second instructions from the FIFO storage and the third CRC code to the one or more physical write addresses of the Flash memory;
   determining, by the Flash controller, the previous write process is performed on a different CRC block based on the one or more physical write addresses; and
   emptying by the Flash controller, the FIFO storage.

2. The method of claim 1, further comprising:
   determining the fetch process is unsuccessful based on the first CRC code being different from the second CRC code; and
   performing both of the readings, the calculating the second CRC code, the comparing, and the determining the fetch process is successful based on the first CRC code is equal to the second CRC code again.

3. The method of claim 1, wherein the writing the one or more second instructions to the FIFO storage is uninterrupted by other operations and fills up a CRC block.

4. The method of claim 1, wherein the converting, by the Flash controller, the one or more virtual read addresses to the one or more physical read addresses, comprises:
   determining each of the one or more physical read addresses using a following formula:

$$\text{physical read address} = \text{virtual read address} + (\text{virtual read address} >> 4).$$

5. The method of claim 1, wherein a size of a CRC block is determined by one of a length of a CPU cache line and a capacity of the FIFO storage.

6. A computing system comprising:
   one or more processors;
   a Flash controller; and
   a memory storing commands that, when executed by the one or more processors, configure the computing system to perform operations comprising:
   receive a fetch request for one or more first instructions located at one or more virtual read addresses from the one or more processors, the one or more virtual read addresses corresponding to one or more physical read addresses of a Flash memory;
   convert the one or more virtual read addresses to the one or more physical read addresses;

read the one or more first instructions located at the one or more physical read addresses of the Flash memory to a FIFO storage;
read a first CRC code associated with the one or more first instructions;
calculate a second CRC code based on the one or more first instructions;
compare the first CRC code and the second CRC code; and
determine a fetch process is successful based on the first CRC code is equal to the second CRC code;
receive, by the Flash controller, a write request for writing one or more second instructions to one or more virtual write addresses in the Flash memory from the one or more processors;
convert, by the Flash controller, the one or more virtual write addresses to one or more physical write addresses;
determine, by the Flash controller, a previous operation is a previous write process;
determine, by the Flash controller, the previous write process is performed on a same CRC block based on the one or more physical write addresses;
write, by the Flash controller, the one or more second instructions to the FIFO storage;
calculate, by the Flash controller, a third CRC code associated with the one or more second instructions until the writing, by the Flash controller, the one or more second instructions to the FIFO storage fills up the FIFO storage;
write, by the Flash controller, the one or more second instructions from the FIFO storage and the third CRC code to the one or more physical write addresses of the Flash memory;
determine, by the Flash controller, the previous write process is performed on a different CRC block based on the one or more physical write addresses; and
emptying, by the Flash controller, the FIFO storage.

7. The computing system of claim 6, wherein the instructions further configure the computing system to perform operations comprising:
determine the fetch process is unsuccessful based on the first CRC code being different from the second CRC code; and
perform both of the readings, the calculating the second CRC code, the comparing, and the determining the fetch process is successful based on the first CRC code is equal to the second CRC code again.

8. The computing system of claim 6, wherein the converting, by the Flash controller, the one or more virtual read addresses to the one or more physical read addresses, comprises:
determine each of the one or more physical read addresses using a following formula:

$$\text{physical read address} = \text{virtual read address} + (\text{virtual read address} >> 4).$$

9. A non-transitory computer-readable storage medium including commands that when executed by a computing system, cause the computing system to perform operations comprising:
receive a fetch request for one or more first instructions located at one or more virtual read addresses from one or more processors, the one or more virtual read addresses corresponding to one or more physical read addresses of a Flash memory;
convert the one or more virtual read addresses to the one or more physical read addresses;
read the one or more instructions located at the one or more physical read addresses of the Flash memory to a FIFO storage;
read a first CRC code associated with the one or more first instructions;
calculate a second CRC code based on the one or more first instructions;
compare the first CRC code and the second CRC code; and
determine a fetch process is successful based on the first CRC code is equal to the second CRC code;
receive a write request for writing one or more second instructions to one or more virtual write addresses in the Flash memory from the one or more processors;
convert the one or more virtual write addresses to one or more physical write addresses;
determine a previous operation is a previous write process;
determine the previous write process is performed on a same CRC block based on the one or more physical write addresses;
write the one or more second instructions to the FIFO storage;
calculate a third CRC code associated with the one or more second instructions until the writing, by the Flash controller, the one or more second instructions to the FIFO storage fills up the FIFO storage;
write the one or more second instructions from the FIFO storage and the third CRC code to the one or more physical write addresses of the Flash memory;
determine the previous write process is performed on a different CRC block based on the one or more physical write addresses; and
emptying the FIFO storage.

* * * * *